(12) United States Patent
Bober et al.

(10) Patent No.: US 11,149,984 B2
(45) Date of Patent: Oct. 19, 2021

(54) APPARATUS FOR SUPPORTING EXPANSION TANK

(71) Applicants: James T. Bober, Pittsboro, NC (US); Thomas W. Bober, Rochester, NY (US)

(72) Inventors: James T. Bober, Pittsboro, NC (US); Thomas W. Bober, Rochester, NY (US)

(*) Notice: Subject to any disclaimer, the term of this patent is extended or adjusted under 35 U.S.C. 154(b) by 205 days.

(21) Appl. No.: 16/144,561

(22) Filed: Sep. 27, 2018

(65) Prior Publication Data

US 2019/0093923 A1    Mar. 28, 2019

Related U.S. Application Data

(60) Provisional application No. 62/675,388, filed on May 23, 2018, provisional application No. 62/563,857, filed on Sep. 27, 2017.

(51) Int. Cl.
| | | |
|---|---|---|
| *F24H 9/06* | (2006.01) | |
| *F16M 13/02* | (2006.01) | |
| *F24H 1/18* | (2006.01) | |

(52) U.S. Cl.
CPC .............. *F24H 9/06* (2013.01); *F16M 13/02* (2013.01); *F24H 1/188* (2013.01)

(58) Field of Classification Search
CPC ........... F16M 13/02; F24H 9/06; F24H 9/124; F24D 3/1008
USPC .............................................. 248/313, 311.2
See application file for complete search history.

(56) References Cited

U.S. PATENT DOCUMENTS

| | | | |
|---|---|---|---|
| 1,022,409 A | 4/1912 | Foster | |
| 2,344,556 A | 3/1944 | Manley | |
| 2,615,238 A | 10/1952 | Highwood | |
| 2,686,032 A | 8/1954 | Thorson | |
| 2,876,925 A | 3/1959 | Wall et al. | |
| 2,883,139 A | 4/1959 | Dobkin | |
| 3,603,550 A * | 9/1971 | Byrd ..................... | A62C 13/78 248/313 |
| 4,071,976 A | 2/1978 | Chernewski | |
| 4,134,566 A | 1/1979 | Spitzack | |

(Continued)

FOREIGN PATENT DOCUMENTS

| | | |
|---|---|---|
| CN | 201327228 Y | 10/2009 |
| FR | 2825459 A1 | 12/2002 |

OTHER PUBLICATIONS

U.S. Appl. No. 62/291,630, filed Feb. 5, 2016.
U.S. Appl. No. 62/455,089, filed Feb. 6, 2017.

*Primary Examiner* — Bradley Duckworth
(74) *Attorney, Agent, or Firm* — Moore & Van Allen PLLC; Nicholas C. Russell

(57) ABSTRACT

An apparatus supporting a thermal or hydronic expansion tank in fluid communication via a pipe nipple with a water heater in a water piping system. The supporting apparatus comprises a mounting base adapted to be mounted directly to the water heater. A rack constructed of rigid material is adapted to be secured to the tank. The rack is fastened to the mounting base. The tank is mounted in a vertical orientation on the water heater with the pipe nipple pointing upward or downward. There is sufficient spatial separation of the tank from the mounting base to permit the tank to be insulated or otherwise covered for protecting the tank from the environment.

9 Claims, 9 Drawing Sheets

Side View

(56) References Cited

U.S. PATENT DOCUMENTS

| | | | |
|---|---|---|---|
| 4,213,592 A | 7/1980 | Lingenfelser | |
| 4,254,926 A | 3/1981 | Reeberg | |
| 4,379,541 A | 4/1983 | Harkness | |
| 4,441,684 A | 4/1984 | Credle | |
| 5,100,007 A | 3/1992 | Espasandin et al. | |
| 5,393,024 A * | 2/1995 | Daubenspeck | F24H 9/06 248/146 |
| 5,607,133 A * | 3/1997 | Markham | F24H 9/06 248/146 |
| 5,906,302 A * | 5/1999 | Spergel | A62B 25/00 224/250 |
| 6,220,557 B1 * | 4/2001 | Ziaylek | A62C 13/78 248/154 |
| 6,520,123 B2 * | 2/2003 | Parker | F24D 3/1008 122/493 |
| 7,918,204 B2 | 4/2011 | Gignac et al. | |
| D689,980 S | 9/2013 | Ziaylek et al. | |
| 9,222,696 B2 * | 12/2015 | Lesage | F24H 9/2007 |
| 9,605,798 B2 * | 3/2017 | Brown | F16M 13/02 |
| 10,180,267 B2 * | 1/2019 | Bober | F24H 9/06 |
| 10,203,065 B2 * | 2/2019 | Brown | F16M 13/02 |
| 10,429,097 B1 * | 10/2019 | Sexton | F24H 1/188 |
| 2010/0300376 A1 | 12/2010 | Nalini et al. | |
| 2016/0047571 A1 | 2/2016 | Jones et al. | |
| 2017/0159877 A1 | 6/2017 | Brown et al. | |
| 2017/0268717 A1 * | 9/2017 | Roskamp | A62C 13/78 |
| 2017/0276405 A1 | 9/2017 | Bober | |
| 2019/0145659 A1 * | 5/2019 | Bober | F24H 1/188 248/207 |
| 2020/0072501 A1 * | 3/2020 | Raw | F24H 1/188 |

* cited by examiner

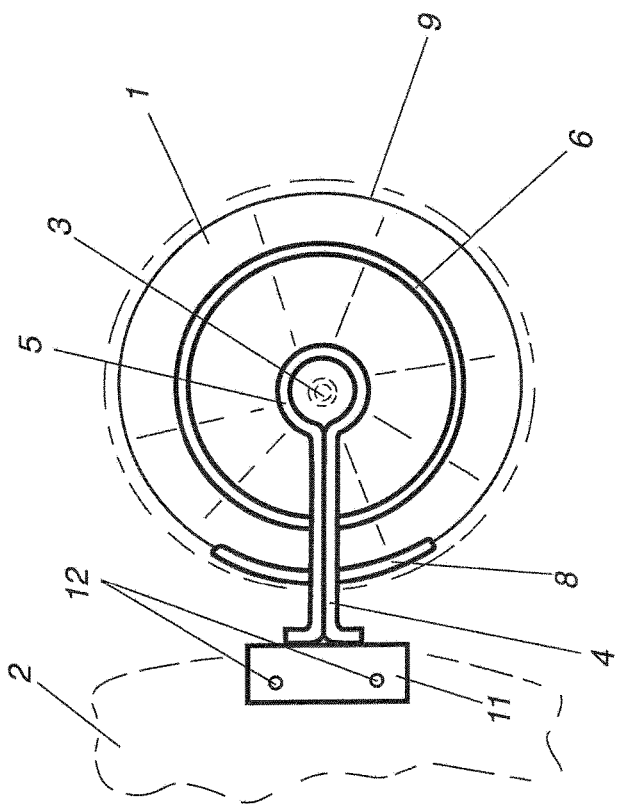
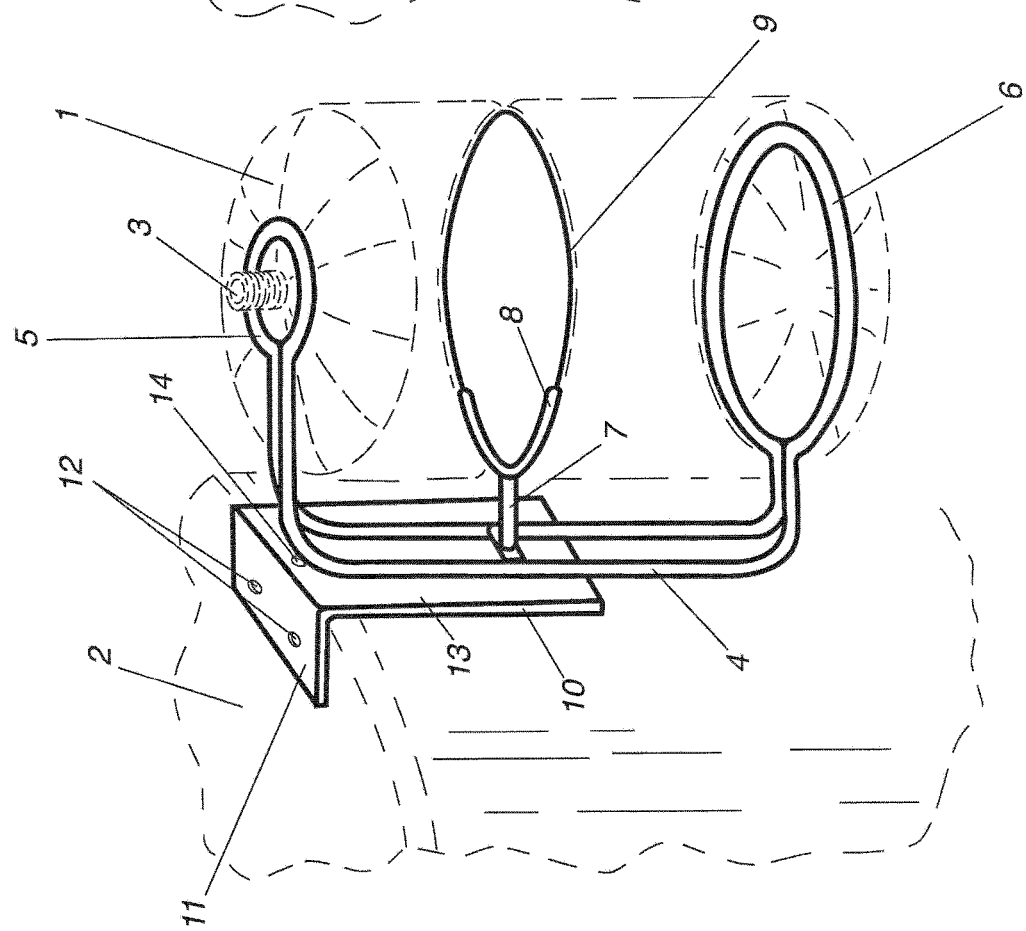

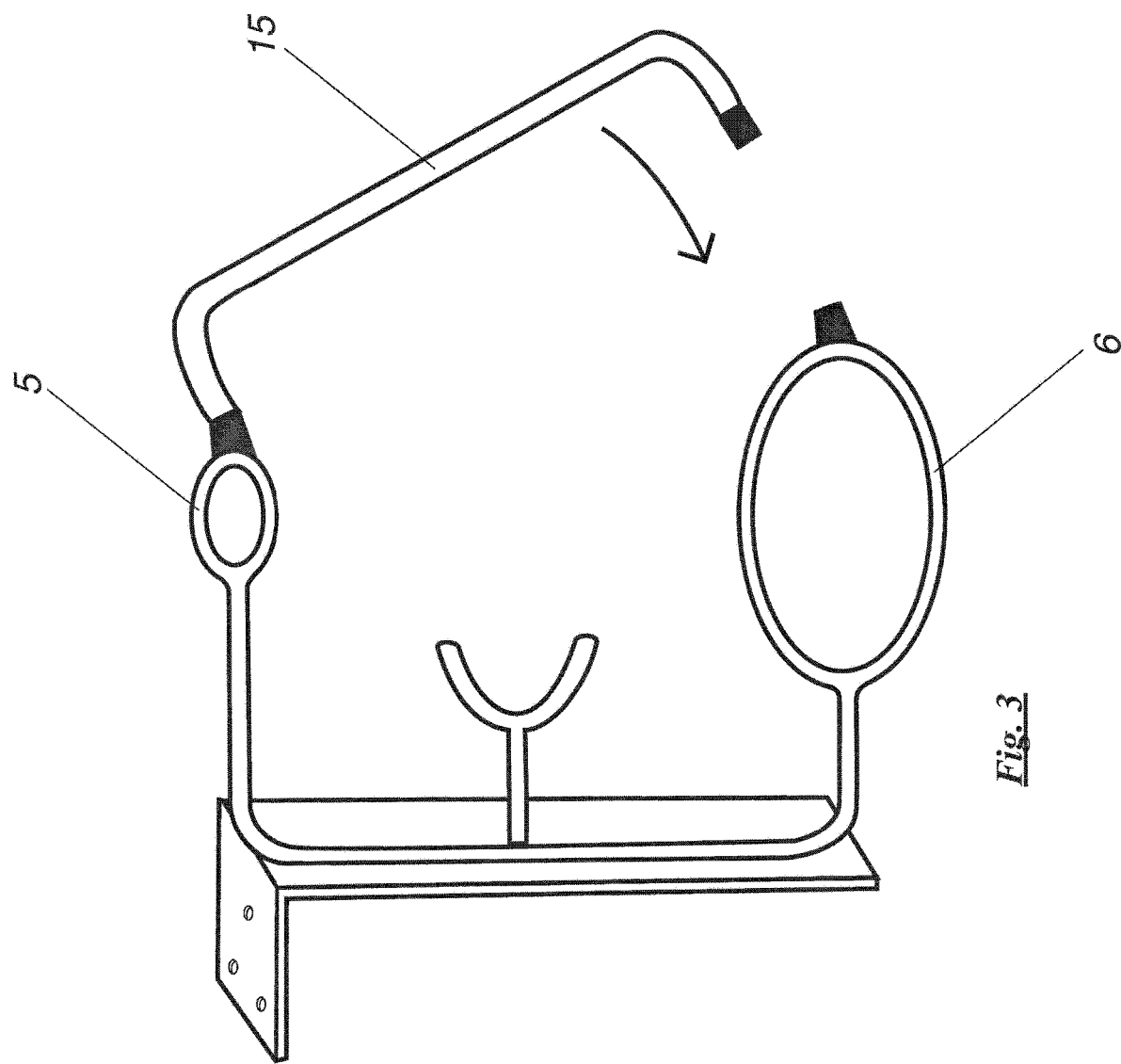

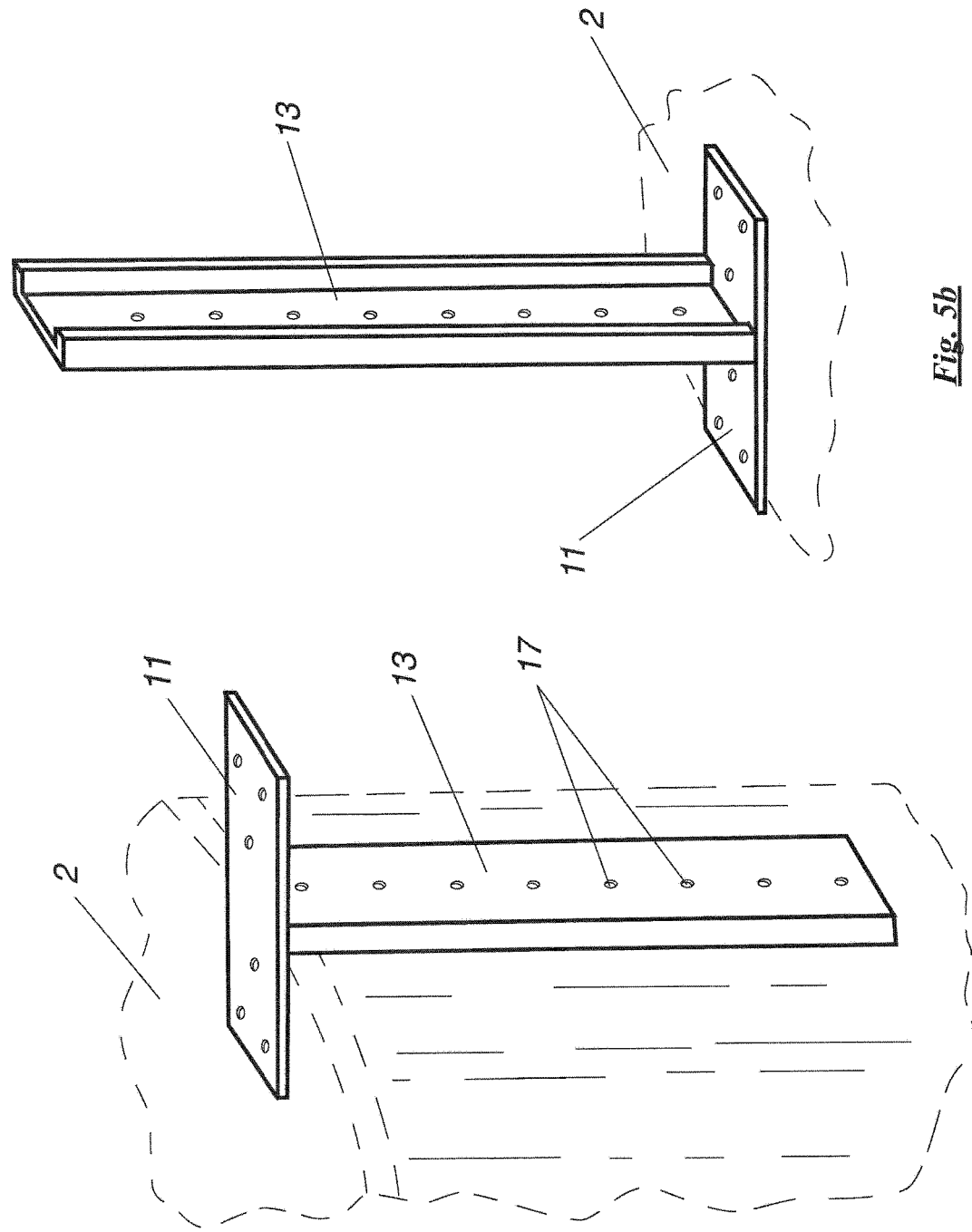

*Top View*

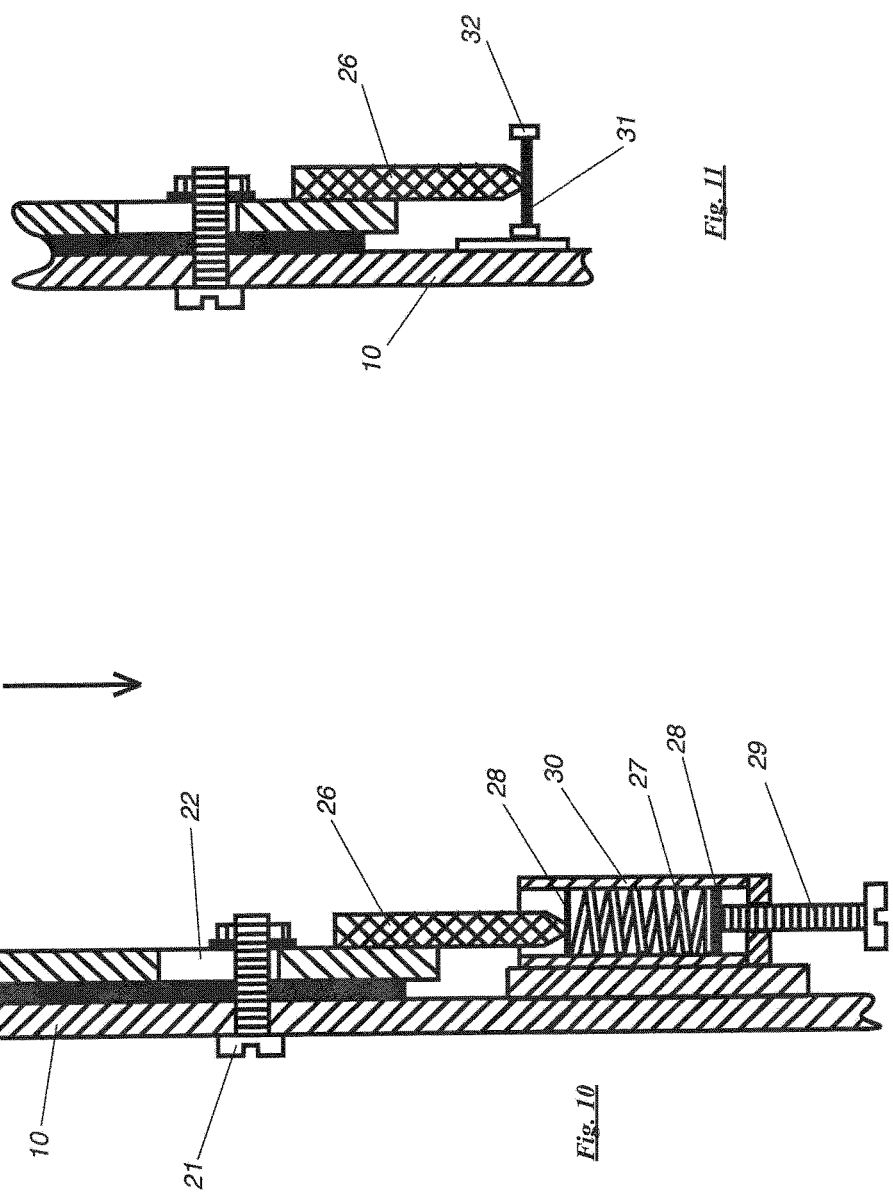

APPARATUS FOR SUPPORTING EXPANSION TANK

CROSS-REFERENCE TO RELATED APPLICATIONS

This application claims the benefit of U.S. Provisional Application No. 62/675,388 filed on May 23, 2018, and U.S. Provisional Application No. 62/563,857 filed on Sep. 27, 2017, the entirety of each of which is incorporated herein by reference.

BACKGROUND

An apparatus is provided for supporting an expansion tank and, more particularly, a bracket is provided for attachment between an expansion tank and an associated hot water heater or adjacent structure.

Expansion tanks are used in domestic water systems particularly to protect hydronic or thermal heating systems. An expansion tank is required when the water system includes a backflow prevention device such as a check valve, a pressure reducing valve, or other means of reduced pressure backflow protection. The tank is a manufactured cylindrical vessel normally possessing slightly rounded ends and typically made of steel or other rigid material, which conventionally may be rated to take an internal pressure of up to 200 pounds per square inch (psi). The expansion may be provided with a pipe nipple usually at the center of one end for connection to the plumbing, thereby permitting water and any entrained air to enter and exit the tank. The expansion tank houses an internal expandable rubber bladder to separate the water from a cushion of pressurized air within the tank. An air valve often placed at the opposite end of the tank permits a plumber or installer to adjust the air pressure behind the bladder to correspond as needed to the normal system water pressure. In the absence of the air valve, a predetermined back pressure is applied to the bladder during manufacture.

U.S. patent application Ser. No. 15/425,285 describes a simple, compact and inexpensive bracket to affix a thermal expansion tank in a hydronic system directly to a moveable free-standing structure, including a commercial or industrial hot water heater, without relying on structural support from the system piping. Accordingly, means that has been installed to protect the surroundings from flooding and water damage due to failure of the water heater, such as an overflow drainage tray installed under the heater or a flood alarm system, can simultaneously protect against failure of the expansion tank. Separate flooding protection and extra piping as would be needed for tanks located remotely from the water heater including those mounted on a nearby building structural member is not needed.

Commercial insulating jackets are available for expansion tanks. However, the conventional insulating jackets may not necessarily fit an expansion tank and bracket without interference from the bracket itself.

For the foregoing reasons, there is a need for an apparatus for supporting an expansion tank which permit the use of insulating jackets or other insulating materials. Ideally, the new supporting apparatus will provide a universal bracket that can be used in various vertical orientations whether installed along the side of the water heater or above the top of the water heater, with the pipe nipple facing vertically either upward or downward as desired by the installer.

SUMMARY

An apparatus supporting a thermal or hydronic expansion tank in fluid communication via a pipe nipple with a water heater in a water piping system. The supporting apparatus comprises a mounting base adapted to be mounted directly to the water heater. A rack constructed of rigid material is adapted to be secured to the tank. The rack is fastened to the mounting base. The tank is mounted in a vertical orientation on the water heater with the pipe nipple pointing upward or downward. There is sufficient spatial separation of the tank from the mounting base to permit the tank to be insulated or otherwise covered for protecting the tank from the environment.

The embodiments of the supporting apparatus provide quick and easy placement of the tank on the water heater using a mounting bracket with the nipple facing vertically either upward or downward. The tank may be positioned either hanging from the side of the heater or alternatively suspended directly above the top surface of the heater either facing inward or cantilevered outward off the edge of the water heater. In one embodiment, the height of the tank relative to the water heater is adjustable, as space requirements in a particular plumbing installation dictate. In all embodiments, the tank is able to be insulated by commercially available pre-formed insulating jackets or other covering material without undue interference from the bracket itself.

BRIEF DESCRIPTION OF THE DRAWINGS

For a more complete understanding of the apparatus for supporting an expansion tank, reference should now be had to the embodiments shown in the accompanying drawings and described below. In the drawings:

FIG. 1 is a perspective view of an embodiment of a bracket for use in supporting a thermal expansion tank on a hot water tank, both of which are shown in phantom.

FIG. 2 is a top plan view of the bracket as shown in FIG. 1 supporting a thermal expansion tank on a hot water tank, both of which are shown in phantom.

FIG. 3 is a perspective view of the bracket as shown in FIG. 1 including a hinged bar securing the tank in the bracket.

FIGS. 5*a* and 5*b* show an embodiment of a mounting base for positioning the expansion tank along a side or on top, respectively, of a water heater shown in phantom and allowing height adjustment.

FIG. 10 is an up close longitudinal cross-section view of an embodiment of an apparatus for detecting failure of an expansion tank in combination with an apparatus for supporting the expansion tank on a hot water heater.

FIG. 11 is an up close longitudinal cross-section view of another embodiment of an apparatus for detecting failure of an expansion tank in combination with an apparatus for supporting the expansion tank on a hot water heater.

DESCRIPTION

Figure 4:
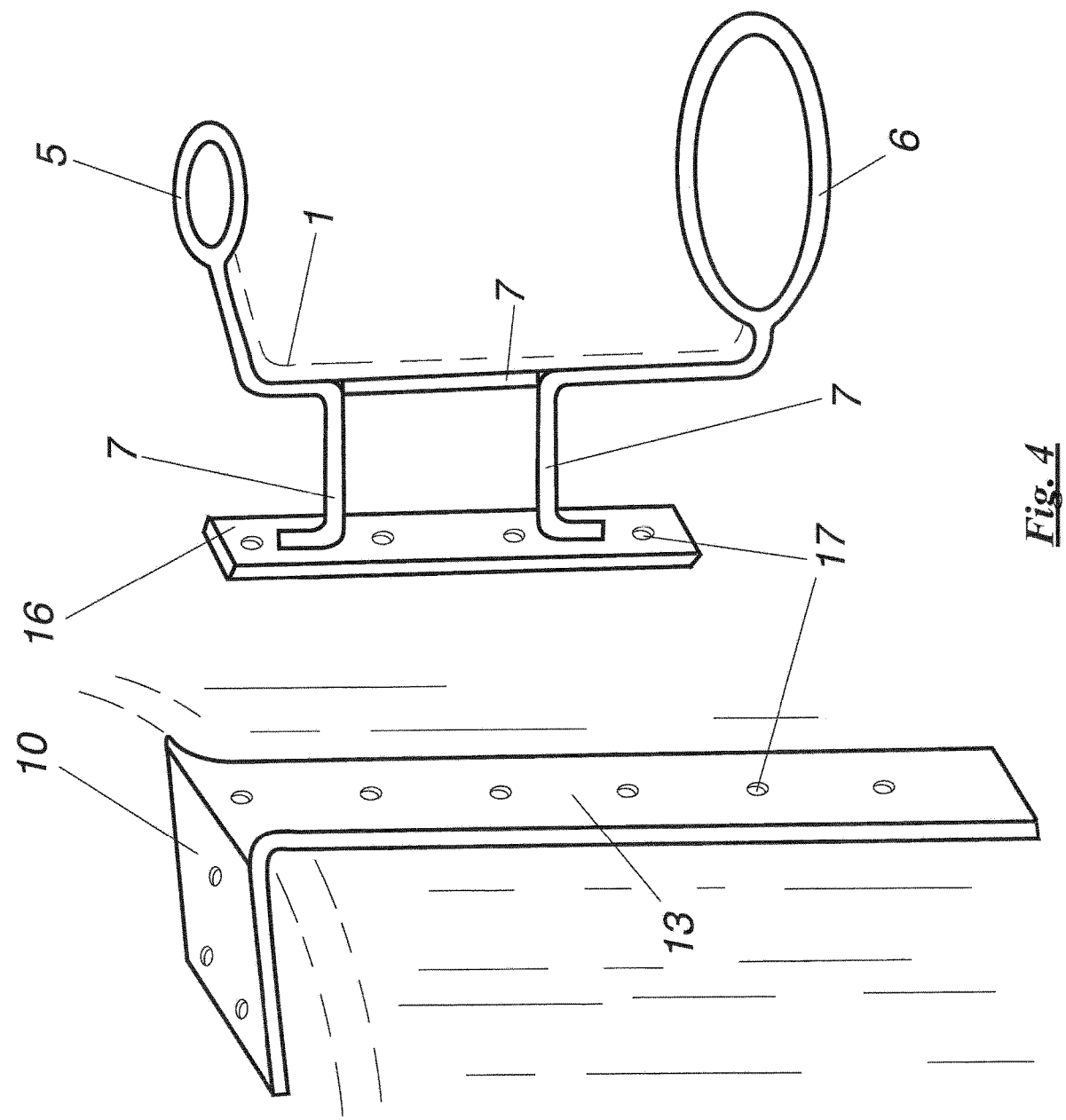
FIG. 4 is an exploded perspective view of a height adjustable embodiment of a bracket for use in supporting a thermal expansion tank on a hot water tank shown in phantom.

Certain terminology is used herein for convenience only and is not to be taken as a limiting. For example, words such as "upper," "lower," "left," "right," "horizontal," "vertical," "upward," "downward," "top" and "bottom" merely describe the configurations shown in the FIGs. Indeed, the components may be oriented in any direction and the terminology, therefore, should be understood as encompassing such variations unless specified otherwise. The words "interior" and "exterior" refer to directions toward and away from, respectively, the geometric center of the core and designated parts thereof. The terminology includes the words specifically mentioned above, derivatives thereof and words of similar import.

A supporting apparatus for a thermal expansion tank is described herein and comprises a universal bracket member suitable for supporting the thermal expansion tank in compliance with the requirements of official plumbing codes and inspections. Referring now to the drawings, wherein like reference numerals designate corresponding or similar elements throughout the several views, FIGS. 1 and 2 illustrate one embodiment of a supporting apparatus for a thermal expansion tank. A typical commercially available thermal expansion tank 1 and a portion of a hot water heater 2 are shown in phantom. The expansion tank 1 comprises a cylindrical metal tank having slightly rounded ends and including a threaded pipe nipple 3 at the center of one end and a peripheral banding area of slightly reduced circumference whereby the tank may be externally banded or fastened to a building structural element by a strapping or wiring means. It is understood by those skilled in the art that various alternative configurations by different manufacturers are possible, including different operating characteristics for different load situations, different locations for the pipe nipple 3 and an air valve, weld seam, or peripheral banding area are possible.

The supporting apparatus includes a bracket comprising a rack 4 and a mounting base 10. The bracket holds and suspends the tank 1 on the side of the water heater 2 with the nipple 3 pointing upward. Rigid ¼" steel wire may be used to form the rack 4, shown in FIGS. 1 and 2 as a pair of wires, although many other materials and configurations are possible including use of flat, tubular or other profiles. A nipple ring 5 at one end of the rack 4 loosely surrounds the nipple 3 for supporting the tank 1 in the area of the nipple 3. A base ring 6 spaced from and concentric with the nipple ring 5 supports the base of the tank 1 at the end opposite the nipple 3. The distance between the nipple ring 5 and the base ring 6 is predetermined such that the flexibility of the steel wire allows the user to snap the tank 1 securely into place after first inserting the nipple 3 into nipple ring 5. Shallow cage structures formed out of smaller diameter rigid wire could replace the nipple ring 5 or the base ring 6 provided they fitted tightly enough to the tank 1 to not interfere with an overlying insulating jacket.

The rack as well as the mounting means may be molded or otherwise formed wholly, or in part, from one or more different rigid materials such as a rigid polymer, including carbon-fiber or glass-filled polymer rather than metal, provided that they would retain their rigidity and structure under continued use. It is understood that the scope of the description of the supporting apparatus is not intended to be limited by the materials listed here, but may be carried out using any material which allows the construction and operation of the supporting apparatus described herein.

A separator 7 is disposed between the rings 5,6 and comprises a cross-member extending from the side of the rack and terminating in an arc 8 that approximately corresponds to the circumference of the tank 1. A flexible band 9 is attached to the ends of the arc 8 and functions as means for securing the tank 1 in the rack 4. The tank securing means may comprise a nylon tie strap, although it is understood that the securing means could alternatively be a metal cable, steel banding clamp or similar securing means known to the art to wrap around the tank 1 to hold the tank 1 securely in place against the arc 8. The separator 7 serves to keep the tank 1 away from the heater 2 a sufficient distance such that insulation material can be placed around the tank 1. In the configuration shown, neither the cross-member nor the nipple ring 5 or base rings 6 or their extensions interfere substantially with the insulation. The banding area of the tank 1 is a slightly depressed circumference area near the midpoint of the tank 1 and is designed for receiving the banding or strapping. The separator 7 is located here to take advantage of this feature, although the separator 7 could be placed at any height along the tank 1.

The mounting base 10 shown in FIGS. 1 and 2 comprises an upper flange portion 11 that rests on top of the heater 2 and a longer depending column 13 extending perpendicularly from the flange portion 11. The flange portion 11 has a plurality of screws holes 12 for fastening the mounting base to the top of the water heater 2 such that the column 13 extends downwardly from the edge of the heater 2 for attachment to the rack 4. Optionally, the mounting base 10 could also be additionally fastened to the side of the heater 2 using a screw 14 placed in the top rim of the heater 2.

The tank 1 could optionally be further secured in the rack 4 by fastening a vertical band or strap joining the rings 5, 6 on the side of the rack 4 opposite the column 13. As shown in FIG. 3, this could be a solid wire or flat component 15 hinged to the nipple ring 5 and fastened to the base ring 6 after the tank 1 has been mounted in place in the rack 4.

Another embodiment of a bracket for use in supporting a thermal expansion tank 1 on a hot water heater 2, both partially shown in phantom, using a rack including a nipple ring 5 and a base ring 6 is shown in FIG. 4. This embodiment of the bracket is adjustable in height relative to the heater 2. The rack 4 comprises a flat plate 16 attached to the separator 7. The flat plate 16 has vertically spaced holes 17 which match identically spaced holes 17 on the column 13. Fasteners may be used to hold the rack to the column 13 via the flat plate 16. In this embodiment, the separator 7 comprises three wire members, two of which are welded at their ends to the flat plate 16. These are affixed to, or become, extensions of, both the nipple ring 5 and base ring 6. Alternatively the wire members could be flat strips or other profiles. A portion of the separator 7 approximately corresponds to the outer profile of the tank 1 along part of its length to retard horizontal movement of the tank 1 toward the heater 2. The flexible band 9 may be looped around the vertical portion of the separator 7 at an appropriate point and then wrapped around the tank 1 to bind it securely in place against the separator 7.

FIGS. 5a and 5b show an embodiment of the height adjustable mounting base 10. This embodiment of the mounting base is a generally T-shaped member, including a column 13 comprising a channel depending from a longer plate 11 that extends on both sides of the column 13. The column defines longitudinally spaced fastener holes 17, which permits the mounting based to be used either as a hanger on the side of the water heater 2 (FIG. 5*a*) or as a pedestal on top of the water heater 2 (FIG. 5*b*). In the latter configuration, the tank 1 may either face inwardly over the water heater 2 or be cantilevered outwardly from the water heater 2, if desired, for better piping access. In both configurations, the mounting base permits height adjustment as needed, with the tank nipple 3 pointing either downward or upward.

Figure 6B:
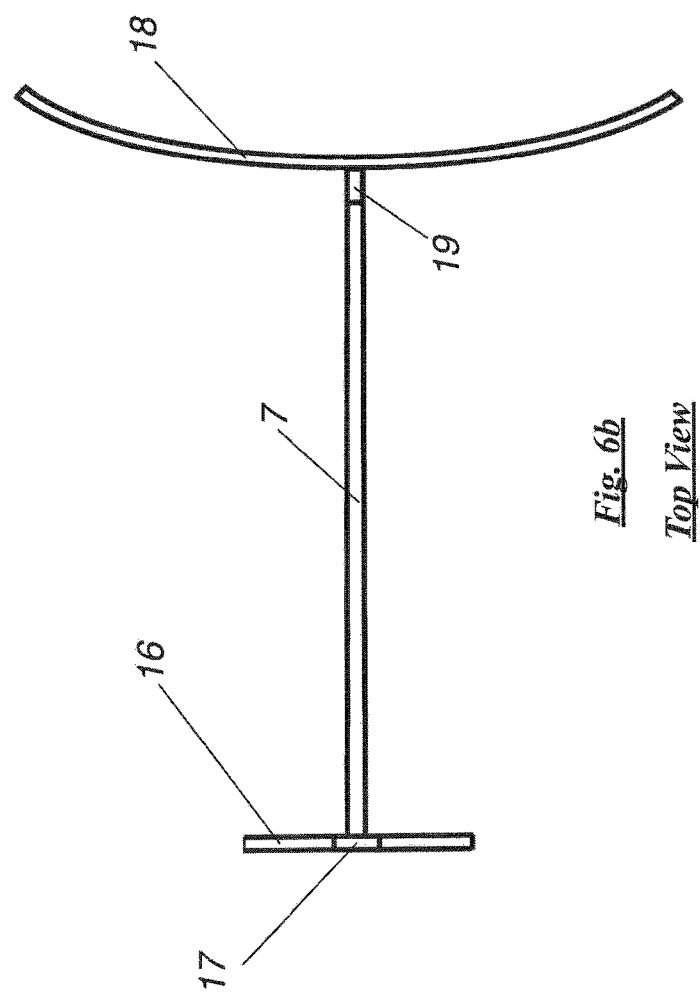
FIGS. 6*a* and 6*b* are a perspective view and a top plan view, respectively, of another embodiment of a mounting base for securing an expansion tank to a water heater.
Figure 6A:
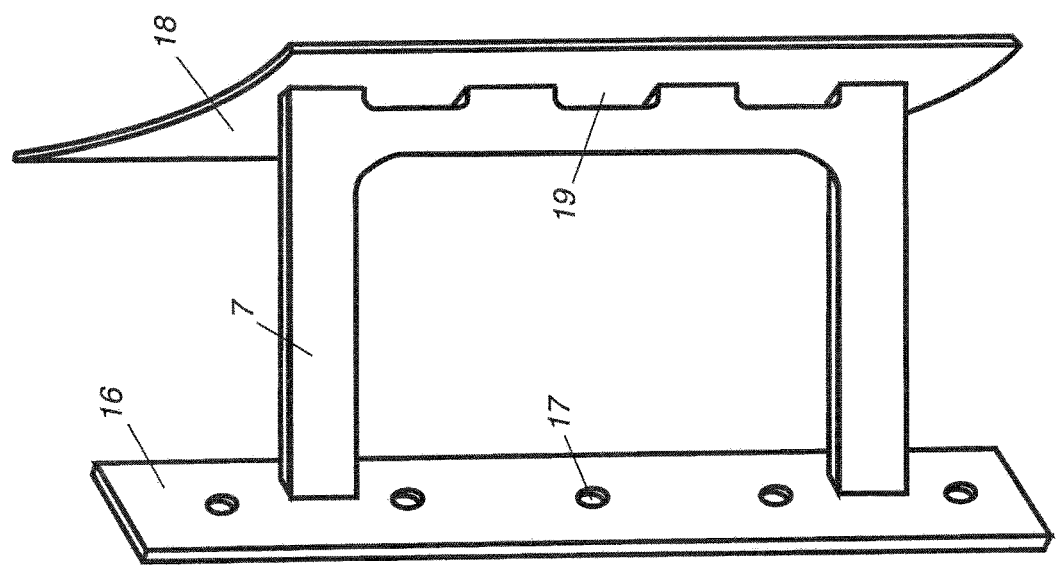

FIGS. 6*a* and 6*b* show another embodiment of the rack comprising an outer curved member 18 connected to a flat plate 16 through a separator 7. The outer curved member 18 corresponds to the side of the tank 1, which is encircled and held securely in place by one or more bands (not shown) passing through slots 19 in the separator 7. As described above, identically spaced holes 17 align with corresponding holes 17 in the column 13 (FIGS. 5*a* and 5*b*) allowing height adjustment.

Figure 7:
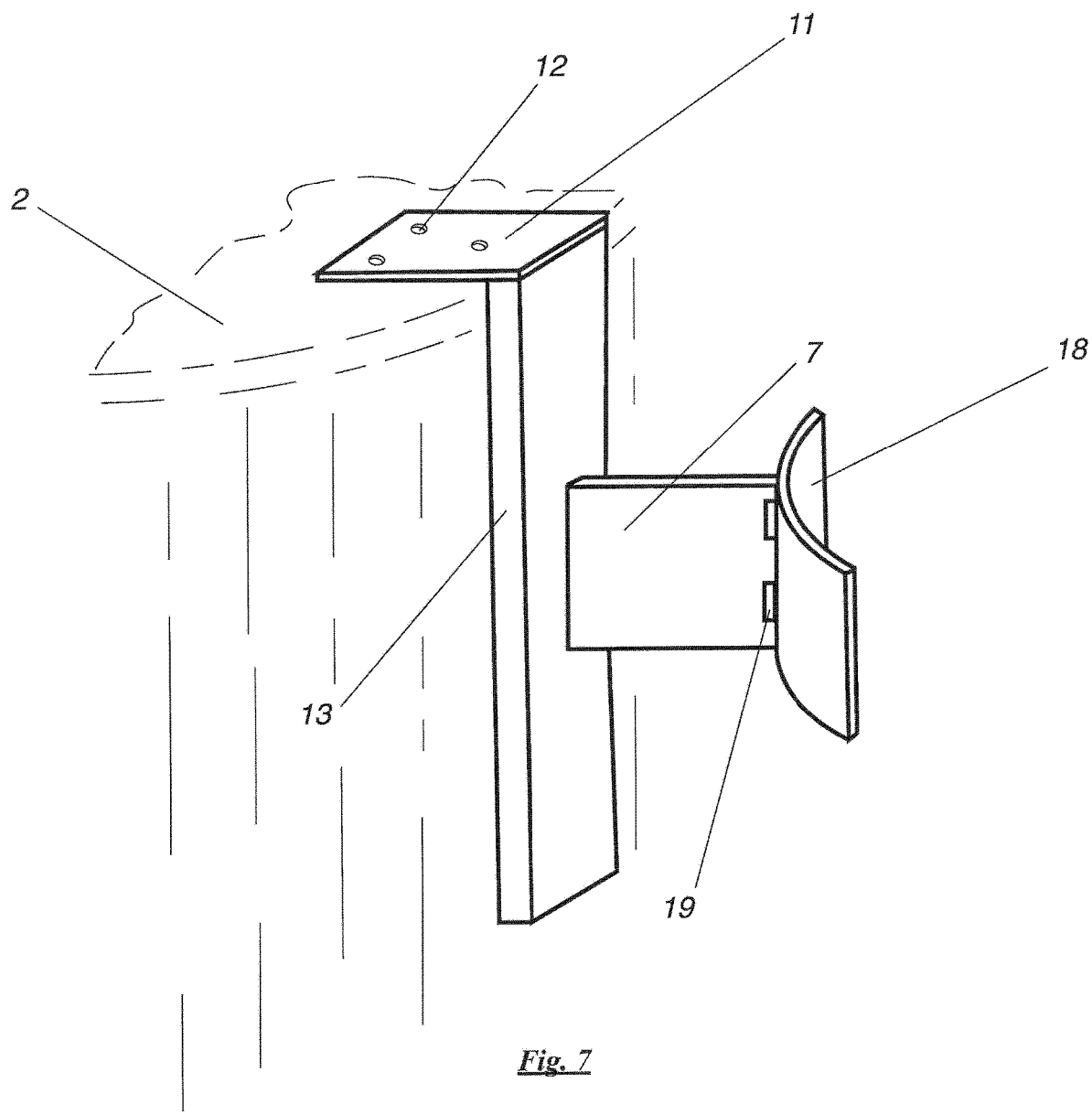
FIG. 7 is a perspective view of a third embodiment of a mounting base for securing an expansion tank to a water heater shown in phantom.

FIG. 7 shows an embodiment of a nonadjustable bracket intended to hang a tank 1 along the side of the water heater 2. The non-adjustable bracket comprises an outer curved member 18 connected to a column 16 through a solid, planar separator 7. The column 13 constitutes a channel depending from the top plate 11 having fastener holes 12. The separator 7 defines slots 19 through which bands (not shown) are inserted to encircle the tank 1 for binding the curved surface 18 securely to the tank. In this arrangement, the tank 1 is easily insulated with a commercially available, preformed insulating jacket without interfering with the bracket.

Figure 8:
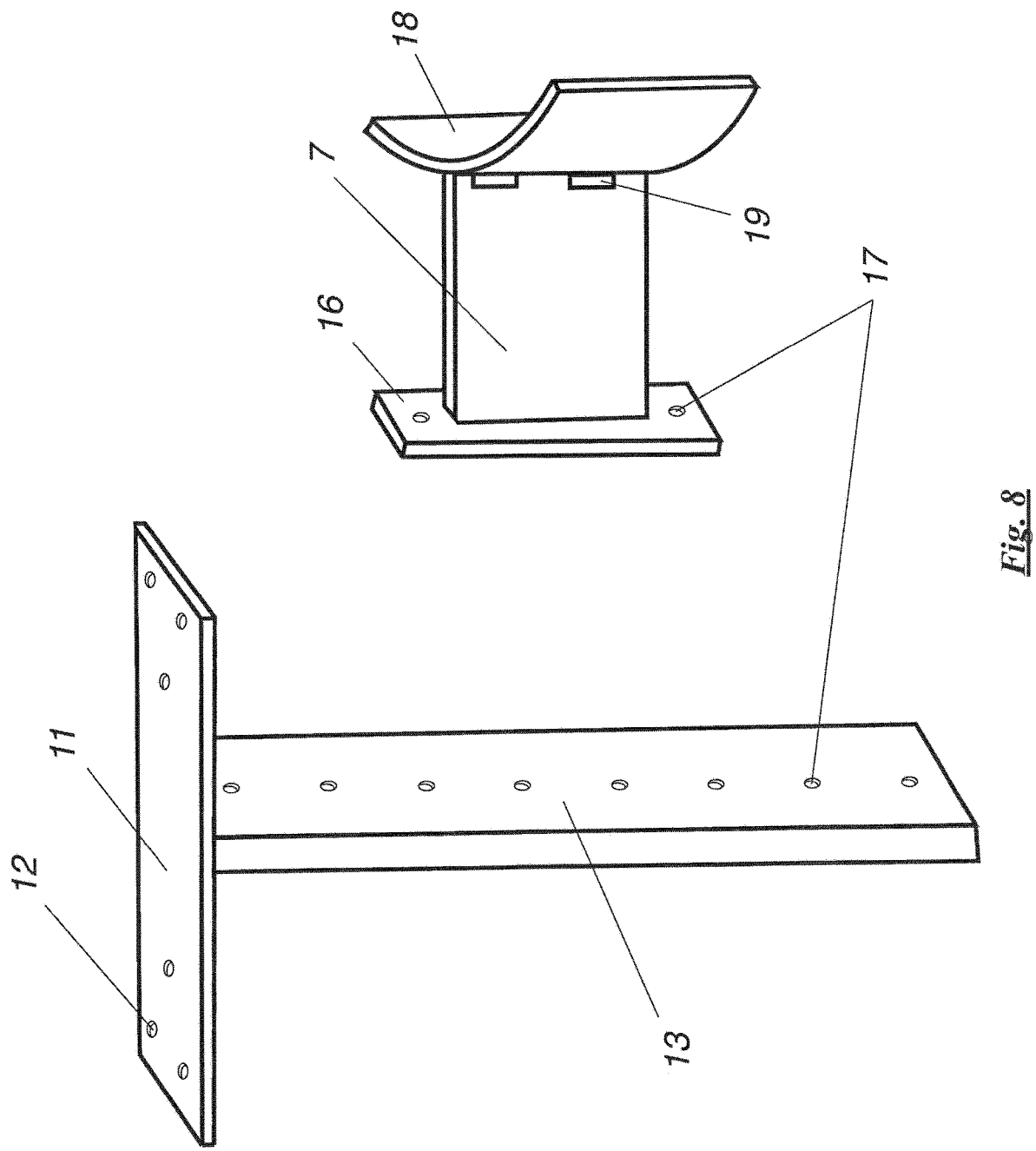
FIG. 8 is an exploded perspective view of a portion of the mounting base as shown in FIG. 7 in combination with the mounting base as shown in FIGS. 5*a* and 5*b*.

Referring to FIG. 8, a universal, adjustable embodiment of the bracket including features in addition to those shown in FIG. 7 and described above. In this embodiment, the rack and the mounting base are separate units. Identically spaced fastener holes 17 are provided in both the flat plate 16 and the column 13. This permits the rack and the mounting base to be fastened together at various relative positions with conventional fasteners. This allows the bracket to be oriented in any vertical position on the side or the top of the water heater 2.

Figure 9:
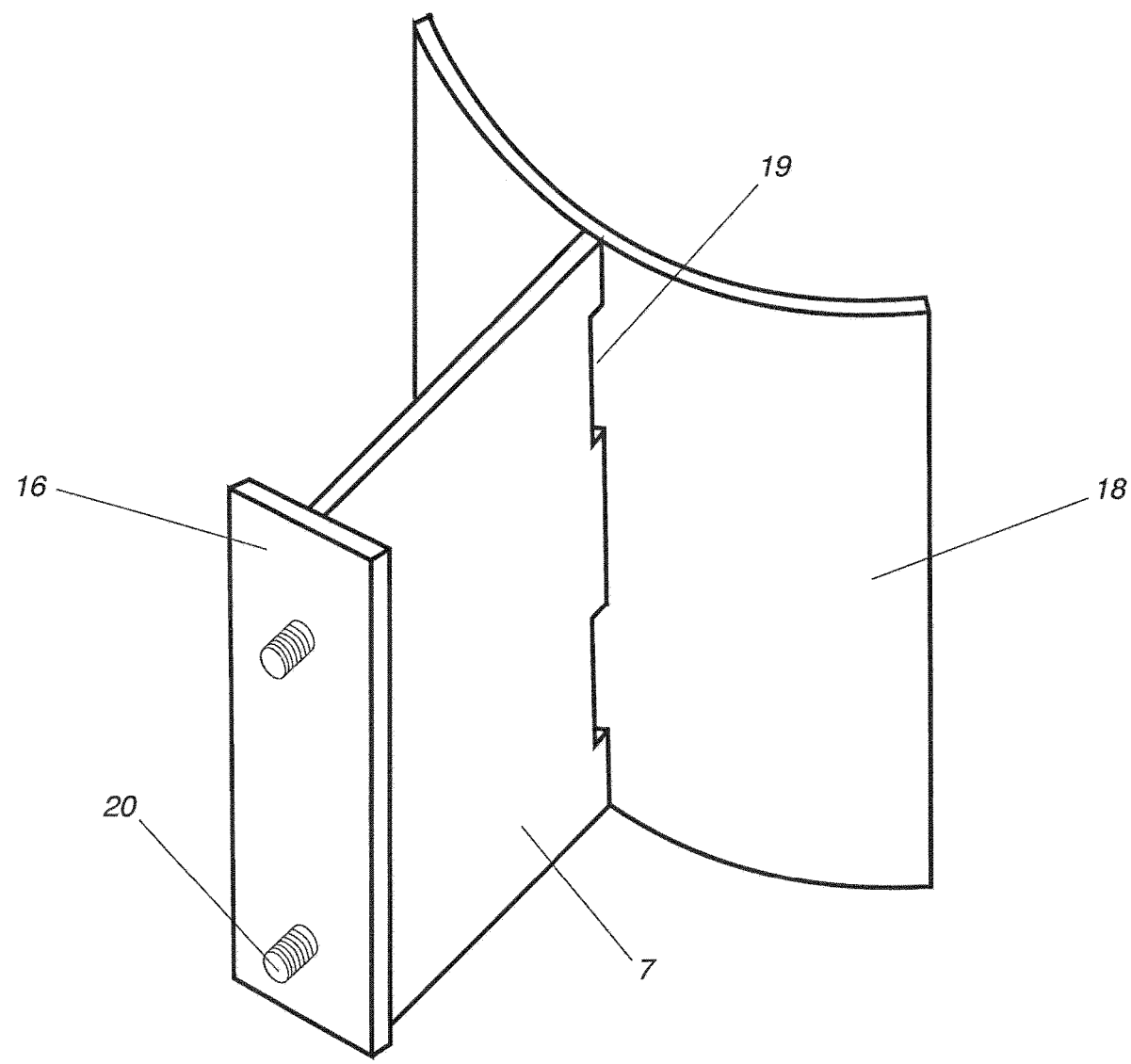
FIG. 9 is a perspective view of the portion of the mounting base as shown in FIG. 7 including integral threaded studs 20.

Referring to FIG. 9, the rack may be fabricated with threaded studs 20 permanently affixed to the flat plate 16. The studs 20 are sized to pass through the matching holes 17 in the column 13 at a desired height and be fastened with nuts. As described above, bands passing through the slots 19 in the separator 7 snugly bind the tank 1 surface against the curved surface 18 underneath overlying insulation.

A thermal expansion tank 1 that fails due to corrosion, penetration or other reason is easily detected by obvious external leakage. However, many users are unable to detect when an expansion tank has failed due to unobvious internal rupture of the rubber bladder, the most common reason for tank failure, until they begin to experience leakage in other parts of the plumbing or other manifestations of trouble. This may result in expensive added repairs on the plumbing system, sometimes even including premature replacement of the water heater or its parts. When the rubber bladder within the expansion tank ruptures with age and repeated use, at this point the entire tank fills with water without there being any opposing air pressure able to force it out. This causes a tank weight gain greater than would exist in normal operation since the section that once contained air is now filled with water.

An embodiment of an assembly for detecting unobvious bladder failure of an expansion tank is shown in FIG. 10. The detection assembly comprises a measuring device to detect excessive weight when the tank becomes overloaded with water upon bladder failure. In this arrangement, the rack 4 is allowed to slide vertically downward by gravity relative to the mounting base 10. Referring to FIG. 10, the rack 4 is attached to mounting means 10 with bolts 20 passing through elongated vertical slots 21 in the flat plate 16. Other similar attaching means known in the art may be used that would allow two adjacent surfaces to slide relative to one another while maintaining contact. Alternatively, the slots 21 could be incorporated in column 10 rather than the flat plate 16. As depicted, the bolts 20 are secured on one side with slippery, easily sliding washers 22 and nuts 23. Optionally one or more slippery, easily sliding components 24 such as, for example, strips of plastic sheeting, Teflon (fluorocarbon), Delrin (acetal), nylon, styrene, polypropylene, polyethylene or the like may be placed between rack 4 and the mounting base 10 to allow vertical downward movement to occur more easily.

A downward-projecting pin or plunger 25 is fastened to rack 4. The plunger 25 contacts a subassembly which is attached to the column 13. The subassembly may be permanently affixed to the mounting base 10 or alternately secured with fasteners to the mounting base 10 such that it could be easily removed and reattached at a different point under the tank if, for example, the mounting means is to be used as a pedestal above the heater rather than hanging along the side of the heater. The subassembly comprises a compression spring 26 between solid movable discs 27 at each end of the spring 26 to provide bearing surfaces. The compression spring 26 and end discs 27 are contained within a tube 29. Alternative ways of restricting sideways movement of the spring 26 may be done by various means known to the art such as having a portion of the pin 25 extend through the spring 26. Spring 26 compression is maintained to a specified degree by an adjustment screw 28 threaded through the lower end of the tube 29. The spring compression retards downward movement of the rack 4 to maintain the tank 1 at a given height when the tank is operating normally. A pointer (not shown) may be provided on the rack 4 and could indicate via markings (not shown) on the mounting base 10 whether the weight is normal or excessive. After installing the tank and turning on the water to fill the tank to its normal operating amount, the installer may adjust the screw 28 to provide the appropriate tank height to indicate normal operation. When the bladder fails and the tank becomes overloaded, the rack 4 slides downward relative to mounting base 10 and the pointer 25 indicates tank failure. Other means known to the art of retarding downward movement of the rack when the tank becomes overloaded due to bladder failure may alternatively be used.

Another means for detecting tank failure using a sliding feature as described is to provide a sacrificial component which irreversibly breaks when subjected to excessive weight. A pressure-relaying member affixed to the rack could rupture or break the sacrificial component designed for one-time use. One such embodiment is shown in FIG. 11 showing the pin or plunger 25 resting on a brittle disc 30. The disc 30 is contained within a supporting ring 31 fastened to the mounting base 10. The disc 30 is configured to break through when a predetermined tank weight is exceeded. Alternatively, other components that irreversibly fail when weight becomes excessive could be employed. A detecting device combining the retarding spring of FIG. 10 and the sacrificial component of FIG. 11 or a similar arrangement is a further possibility.

Still other methods performing the similar function of detecting tank failure by measuring weight gain or changes in rack position, using the sliding feature described above, are possible. For example, alternatively a tension spring attached above the tank and affixed to a pointer, a strain gage, a digital weight-measuring device employing electronics with a possible output signal, a photocell detector to signal a change in tank height, or other such means known to the art for detecting weight, weight changes, or changes in tank position might be used instead.

Although the present supporting apparatus for an expansion tank has been shown and described in considerable detail with respect to only a few exemplary embodiments thereof, it should be understood by those skilled in the art that we do not intend to limit the apparatus to the embodiments since various modifications, omissions and additions may be made to the disclosed embodiments without materially departing from the novel teachings and advantages, particularly in light of the foregoing teachings. Accordingly, we intend to cover all such modifications, omission, additions and equivalents as may be included within the spirit and scope of the supporting apparatus as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. An apparatus supporting a thermal or hydronic expansion tank in fluid communication via a pipe nipple with a water heater in a water piping system, the supporting apparatus comprising:
   a mounting base adapted to be mounted directly to the water heater; and
   a rack constructed of rigid material adapted to be secured to the tank, the rack fastened to the mounting base,
      wherein the tank is mounted in a vertical orientation on the water heater with the pipe nipple pointing upward or downward, and
      wherein the mounting base comprises two components permanently joined together, the components comprising a planar flange portion adapted to be fastened horizontally to the top surface of the water heater, and a column member extending perpendicularly and vertically from the planar flange portion, the column member being configured to be connected to the rack, wherein the column member is mounted along the side of the water heater, and
   wherein there is spatial separation of the tank from the mounting base, the spatial separation comprising space to permit an outer insulation jacket to cover the tank.

2. A supporting apparatus as recited in claim 1, further comprising means for securing the tank to the rack.

3. A supporting apparatus as recited in claim 2, wherein the securing means comprises a flexible band to encircle the tank and secure the tank to the rack.

4. A supporting apparatus as recited in claim 1, wherein the tank may be mounted in the vertical orientation along the side of the water heater.

5. A supporting apparatus as recited in claim 4, wherein the column member is adapted to be additionally fastened to the side of the water heater for added stability.

6. A supporting apparatus as recited in claim 1, wherein the rack comprises a separator for spacing the rack from the mounting base.

7. A supporting apparatus as recited in claim 6, wherein the separator defines at least one opening for passing a flexible band encircling the tank for securing the tank to the rack.

8. A supporting apparatus as recited in claim 1, wherein each of the rack and the mounting base define corresponding longitudinally spaced fastener holes allowing for a plurality of relative positions when connected by fasteners.

9. A supporting apparatus as recited in claim 1, wherein the spatial separation further comprises space to permit the outer insulation jacket of the tank without interference between the mounting base and the outer insulation jacket of the tank.

* * * * *